(12) United States Patent
Patel et al.

(10) Patent No.: US 10,831,061 B1
(45) Date of Patent: Nov. 10, 2020

(54) GRADIENT BACKLIGHT ILLUMINATION

(71) Applicant: Facebook Technologies, LLC, Menlo Park, CA (US)

(72) Inventors: Nirav Rajendra Patel, San Francisco, CA (US); Dong Chen, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 93 days.

(21) Appl. No.: 16/176,954

(22) Filed: Oct. 31, 2018

(51) Int. Cl.
*G02F 1/13357* (2006.01)
*G02B 27/01* (2006.01)

(52) U.S. Cl.
CPC ... *G02F 1/133602* (2013.01); *G02B 27/0172* (2013.01); *G02F 1/133615* (2013.01)

(58) Field of Classification Search
None
See application file for complete search history.

(56) References Cited

U.S. PATENT DOCUMENTS

| | | | |
|---|---|---|---|
| 6,078,427 A * | 6/2000 | Fontaine | G02B 27/0093 345/7 |
| 2017/0139211 A1 | 5/2017 | Trail | |
| 2019/0101759 A1* | 4/2019 | Usukura | G02B 6/0038 |

* cited by examiner

*Primary Examiner* — Nicholas J Lee
(74) *Attorney, Agent, or Firm* — Freestone Intellectual Property Law PLLC; Aaron J. Visbeek (57) ABSTRACT

A display includes a display pixel array, a backlight emitter, and a lightguide. The backlight emitter provides illumination light. The lightguide receives the illumination light from the backlight emitter and distributes the illumination light to illuminate the display pixel array. The lightguide is configured to illuminate a viewing boundary of the display pixel array with an illumination gradient that fades from fully illuminated along a viewing portion to unilluminated along a non-viewing portion.

20 Claims, 8 Drawing Sheets

GRADIENT BACKLIGHT ILLUMINATION

TECHNICAL FIELD

This disclosure relates generally to optics, and in particular to displays.

BACKGROUND INFORMATION

The economies of scale associated with mobile electronics have reduced the prices of many components of consumer electronics. Displays used in mobile electronics have been used as displays in head mounted displays (HMDs). Typically, these displays are rectangular in shape. In the context of virtual reality, providing "presence" enhances the user experience. To assist in providing presence, software filters may be applied to digital images that are to be presented to a user of a head mounted display.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an HMD and a display that includes an illumination gradient backlight along a viewing boundary are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The display and HMD described in this disclosure have an illumination gradient along a viewing boundary of a display that softens the edges of images driven onto the display. A gradient dot pattern that "fades to black" may provide a gradient illumination pattern in a display backlight along a viewing boundary of the display that increases "presence" for a user of the HMD by softening the edges of the image around the viewing boundary.

Conventionally, a software filter is applied to images that are presented to a user of HMD to "soften" the edges of the image as a way to increase presence since a stark contrast where an image ends has been found to be perceived as more artificial in the user experience. However, applying the software filter at the viewing boundary of the presented images requires processing resources and processing time that may create unwanted delay in rendering the images to the display. The disclosed illumination gradient backlight for displays reduces or even eliminates the need to apply a software filter to images presented to a user by providing an illumination gradient along a boundary of a viewing region of the display. The illumination gradient may provide the same or similar "softening" of presented images around the boundary of the viewing region. This reduces the processing burden associated with applying a software filter to presented images and also reduces or eliminates a rendering delay associated with applying the software filter. Reducing or eliminating the rendering delay may be especially important in gaming applications or other real-time experiences.

The disclosed gradient backlight may also reduce the electrical power consumed by the display because non-viewing regions of the display are not illuminated. Conventionally, each pixel of a display pixel array is illuminated with the backlight and the display pixels outside the viewing region are "driven" to a black pixel value so that they transmit or emit very little display light. However, the pixels (e.g. liquid crystal pixels) are still illuminated by the backlight even when the display pixel does not transmit the illumination light. In the disclosed illumination gradient backlight, display pixels outside the viewing region are not illuminated with the backlight. Consequently, less illumination light is required to illuminate the viewing region of the display because the illumination light is properly directed to the viewing region and not wasted by being directed to the non-viewing region.

These and other embodiments are described in detail with respect to FIGS. 1-8 below.

Figure 1:
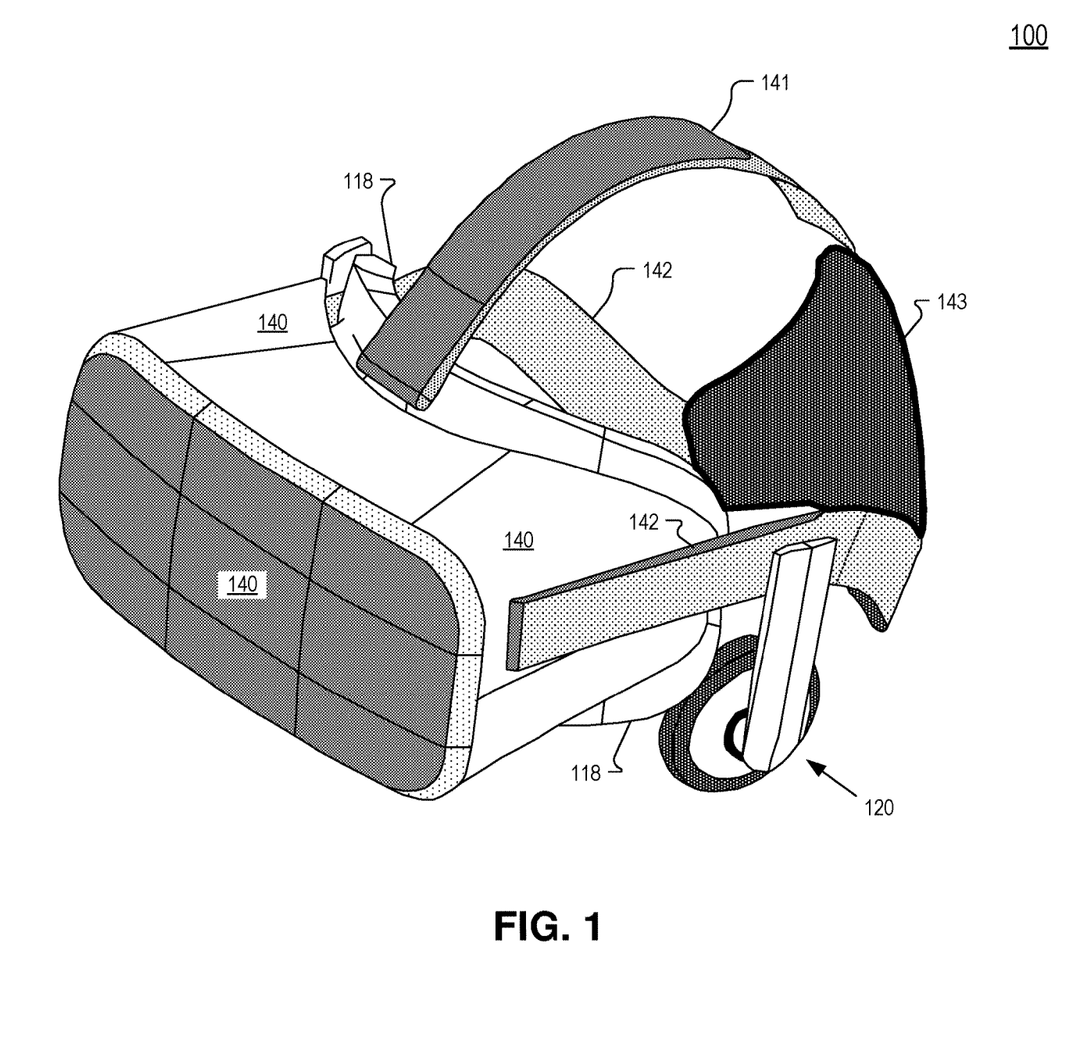
FIG. 1 illustrates an example head mounted display (HMD) that may include one or more displays having an illumination gradient backlight that provides an illumination gradient along a boundary of a viewing region of the display, in accordance with an embodiment of the disclosure.

FIG. 1 illustrates an example head mounted display (HMD) 100 that may include one or more displays having an illumination gradient backlight that provides an illumination gradient along a boundary of a viewing region of the display, in accordance with an embodiment of the disclosure. Example head mounted display (HMD) 100 includes a top structure 141, a rear securing structure 143, and a side structure 142 attached with a viewing structure 140 having a front rigid body 144. The illustrated HMD 100 is configured to be worn on a head of a user of the HMD. In one embodiment, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include a display for directing image light to a wearer of HMD 100. The display may include a Liquid Crystal Display (LCD) having a display pixel array of liquid crystal pixels arranged in rows and columns, for example.

Figure 2:
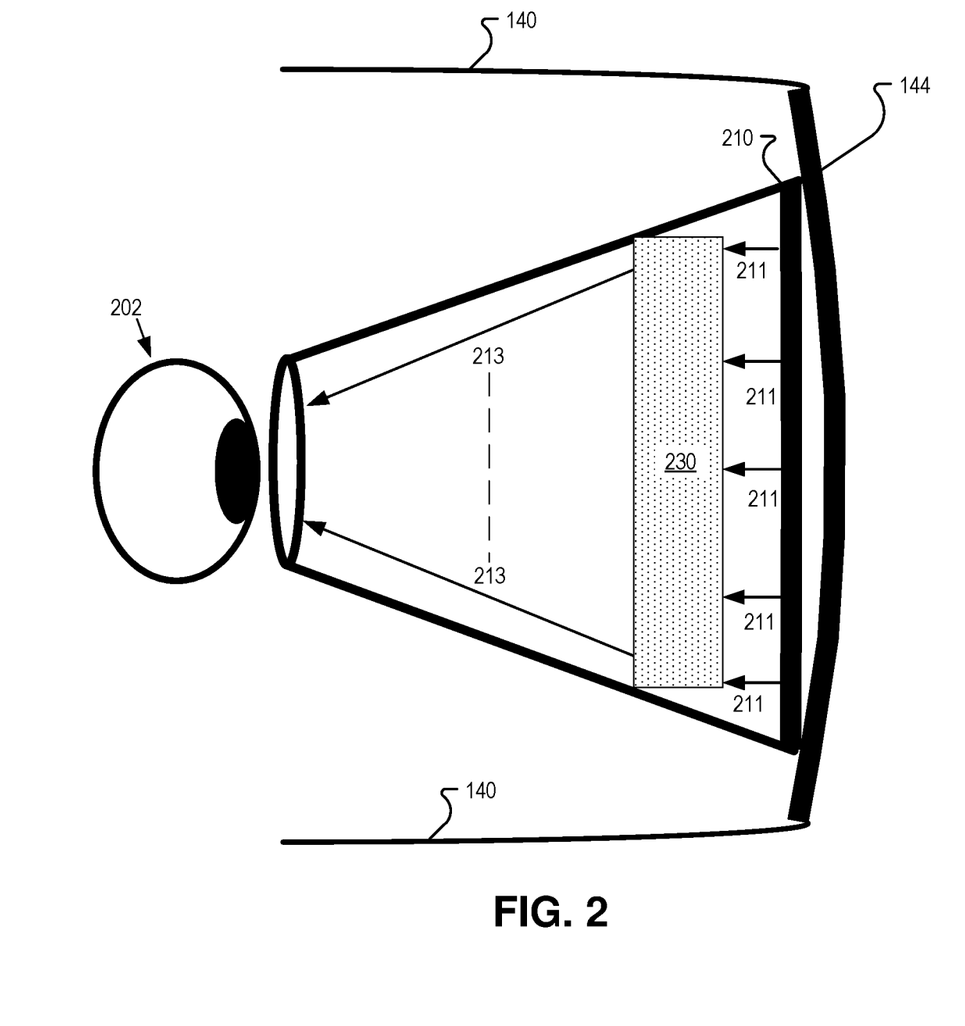
FIG. 2 illustrates a cut away view of an HMD that includes a display and a lens assembly configured to direct display light to an eyebox area, in accordance with an embodiment of the disclosure.

FIG. 2 illustrates a cut away view of an HMD that includes a display 210 and a lens assembly 230 configured to direct display light 211 to an eyebox area, in accordance with an embodiment of the disclosure. Display 210 may be rectangular, in some embodiments. Display 210 may be an LCD illuminated by an illumination gradient backlight in accordance with embodiments of this disclosure. Lens assembly 230 is positioned to receive the display light 211 and direct the display light 211 to eye 202 as image light 213. Lens assembly 230 may be configured to allow eye 202 of a wearer of HMD 100 to focus on a virtual image displayed by display 210 and provide a Field of View (FOV) to a user that corresponds with a viewing region of the display. Although FIG. 2 only illustrates one eye 202, an HMD may have a display 210 (or a portion of a shared display) and a lens assembly 230 for each eye of the user of the HMD.

Figure 3:
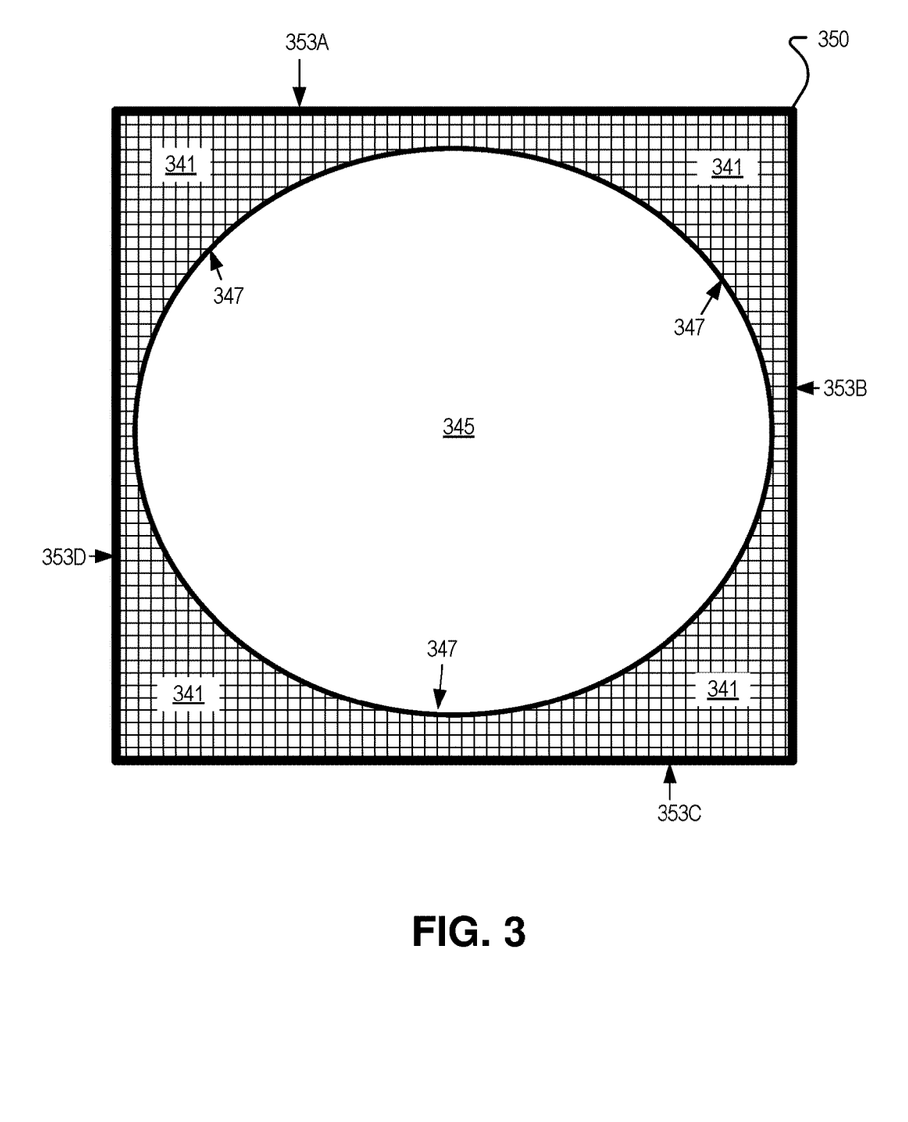
FIG. 3 illustrates a front view of an example rectangular display.

FIG. 3 illustrates a front view of an example rectangular display 350. When display 350 is included in an HMD that includes a lens assembly (e.g. 230) to focus image light for a user, the viewer may only be able to view a viewing portion 345 of display 350. The viewing portion 345 may correspond to a Field of View (FOV) of the lens assembly. There may be two displays 350 and corresponding lens assembly in an HMD (one for each eye). In another embodiment (not illustrated), a single display panel may be used to present images to the eyes of a user. In this embodiment, the display panel may have a greater width than display 350 and there would be two adjacent viewing portions 345 (one for each eye). In the illustrated embodiment of FIG. 3, viewing portion 345 is an elliptical viewing portion and the viewing portion 345 may be circular in some embodiments. FIG. 3 shows that a boundary of the viewing portion 345 is illustrated as viewing boundary 347 and non-viewing portion 341 is outside the viewing portion 345 that corresponds with a FOV of a lens assembly. In the illustrated embodiment, display 350 is shaped as a rectangular having display edges 353A, 353B, 353C, and 353D. In some embodiments, display 350 may be shaped as a square or a hexagon.

Figure 4:
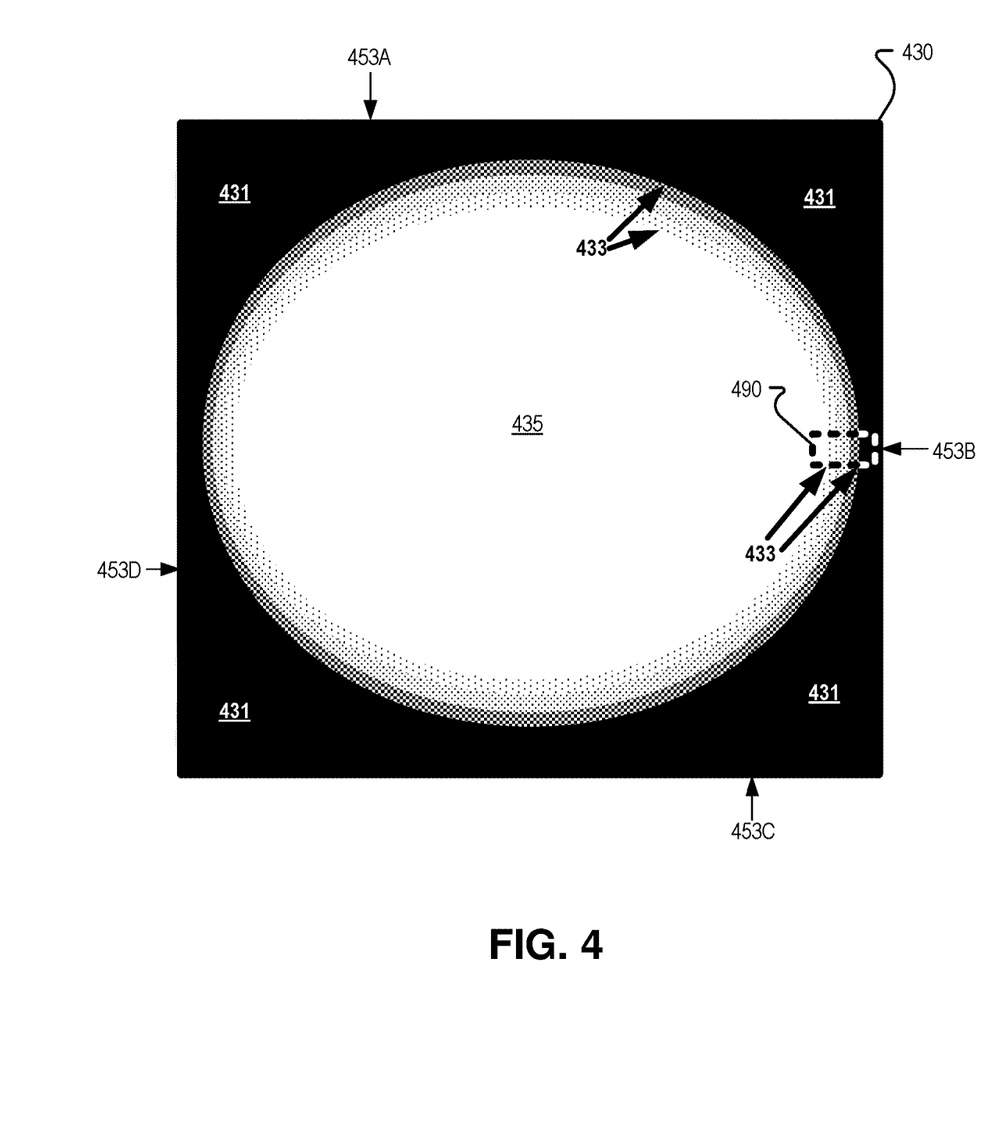
FIG. 4 illustrates an example illumination profile for illuminating a display pixel array that may be generated by an illumination gradient backlight, in accordance with an embodiment of the disclosure.

FIG. 4 illustrates an example illumination profile 430 for illuminating a display pixel array that may be generated by an illumination gradient backlight, in accordance with an embodiment of the disclosure. In illumination region 435, the distribution of illumination light from one or more backlight emitters (e.g. white LEDs) is facilitated to fully illuminate display pixels corresponding to region 435. In the illustrated embodiment, region 435 is elliptical, but the shape of region 435 may depend on the shape of the display and the corresponding lens assembly that focuses light for a viewer. Illumination region 435 is inside the FOV of a lens assembly of an HMD. Illumination region 431 is outside the FOV of the lens assembly and the distribution of illumination light is suppressed or eliminated so that display pixels corresponding to region 431 are not illuminated by backlight illumination light. When a single display panel is used across two eyes to present images to the eyes of a wearer of an HMD (not illustrated), there may be two illumination regions 435 (and corresponding illumination gradient regions).

Illumination gradient region 433 shows that an illumination gradient is disposed between illumination region 435 and 431. Illumination gradient region 433 is along a FOV boundary (e.g. 347) of the lens assembly of the HMD. In illumination gradient region 433, the illumination light progressively decreases as a position within the illumination gradient region 433 gets closer to an edge 453 of the illumination profile 430 (and farther from a middle of illumination region 435). This allows an image driven onto a display to have a "soft" boundary that fades to black around the boundary of the FOV of the user. Region 490 illustrates a portion of illumination gradient region 433 disposed between region 435 and region 431.

Figure 7:
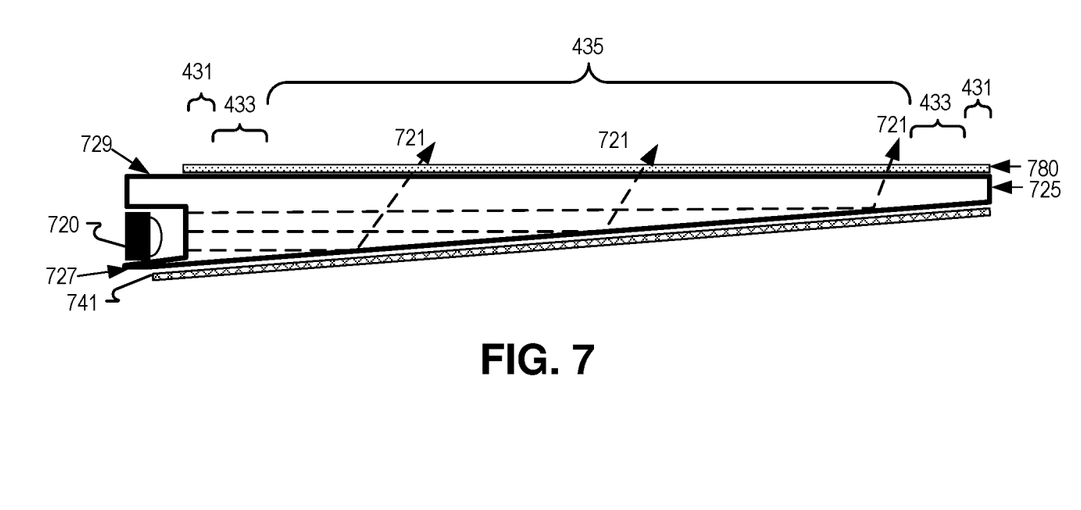
FIG. 7 illustrates a side view of an example gradient backlight having a backlight emitter and a lightguide that generates an illumination gradient along a viewing boundary of a display pixel array, in accordance with an embodiment of the disclosure.

The illumination profile 430 may be achieved by including a gradient of light extraction features in a lightguide of a backlight illuminating a display. For example, FIG. 7 shows an example lightguide 725 for use in edge-lit display architectures where an extraction layer 780 facilitates the distribution of illumination light to illuminate a display pixel array.

Figure 5:
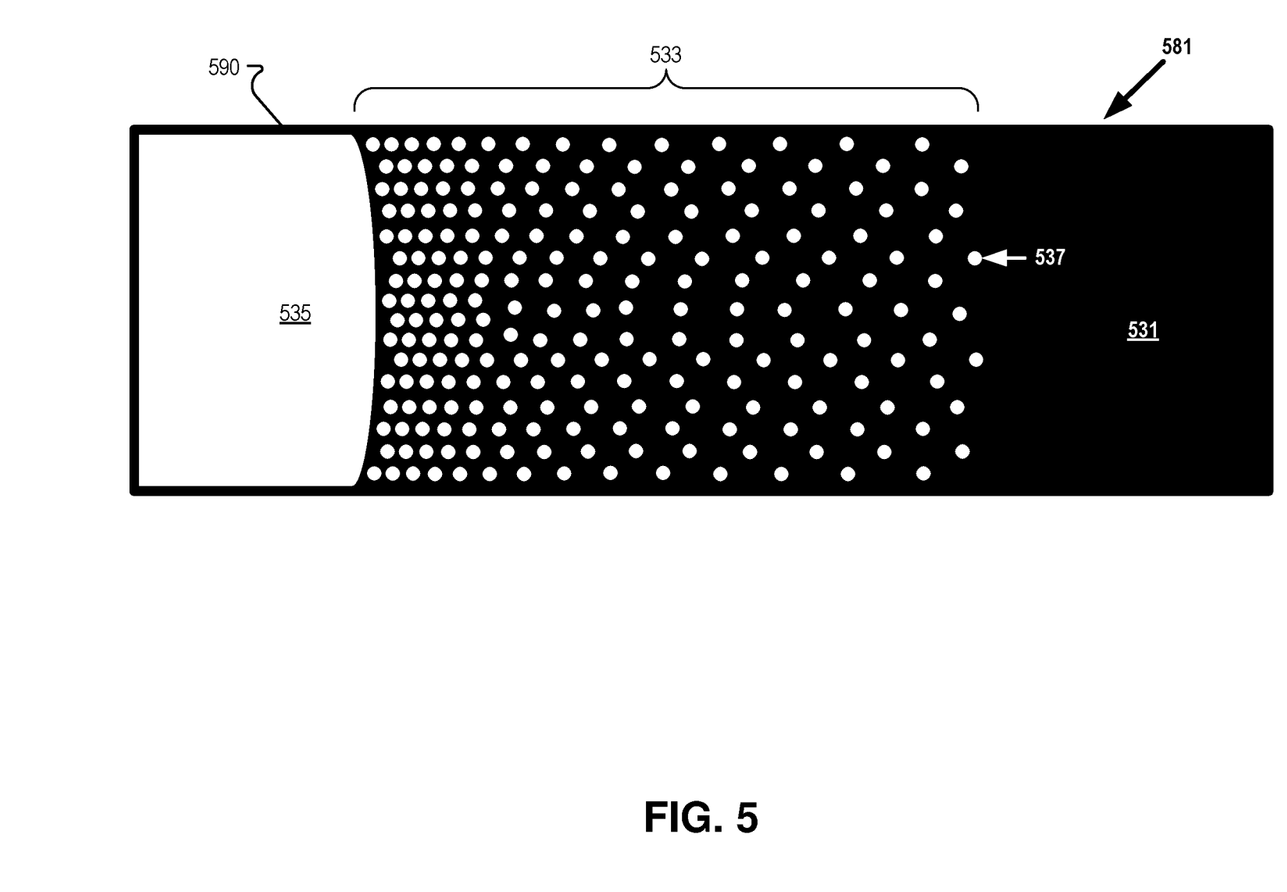
FIG. 5 illustrates a zoomed in example view of a region in FIG. 4, in accordance with an embodiment of the disclosure.

FIG. 5 illustrates a zoomed in example view 590 of region 490, in accordance with an embodiment of the disclosure. Example illumination gradient region 533 illustrates a plurality of dot features 537 arranged in a gradient so that there is a progressively decreasing density of the dots 537 as a distance from an edge of the display decreases. This allows for progressively less illumination of a display pixel array as a position in the illumination gradient region gets closer to a non-viewing region 531 of an illumination profile.

The dot features 537 arranged in a gradient may be implemented as voids in a reflective layer of a lightguide (e.g. lightguide 725). The white voids (shaped as dots) allow illumination light confined to the lightguide to escape to illuminate a display pixel array while the rest of the reflective layer (illustrated as black fill) of the reflective layer reflects the illumination light back into the lightguide. In this example, element 581 of FIG. 5 may represent a portion of the reflective layer. While circular dots are illustrated as the shape of an example light extraction feature in FIG. 5, it is understood that other shapes may be used in light extraction features to provide an illumination gradient.

Figure 6:
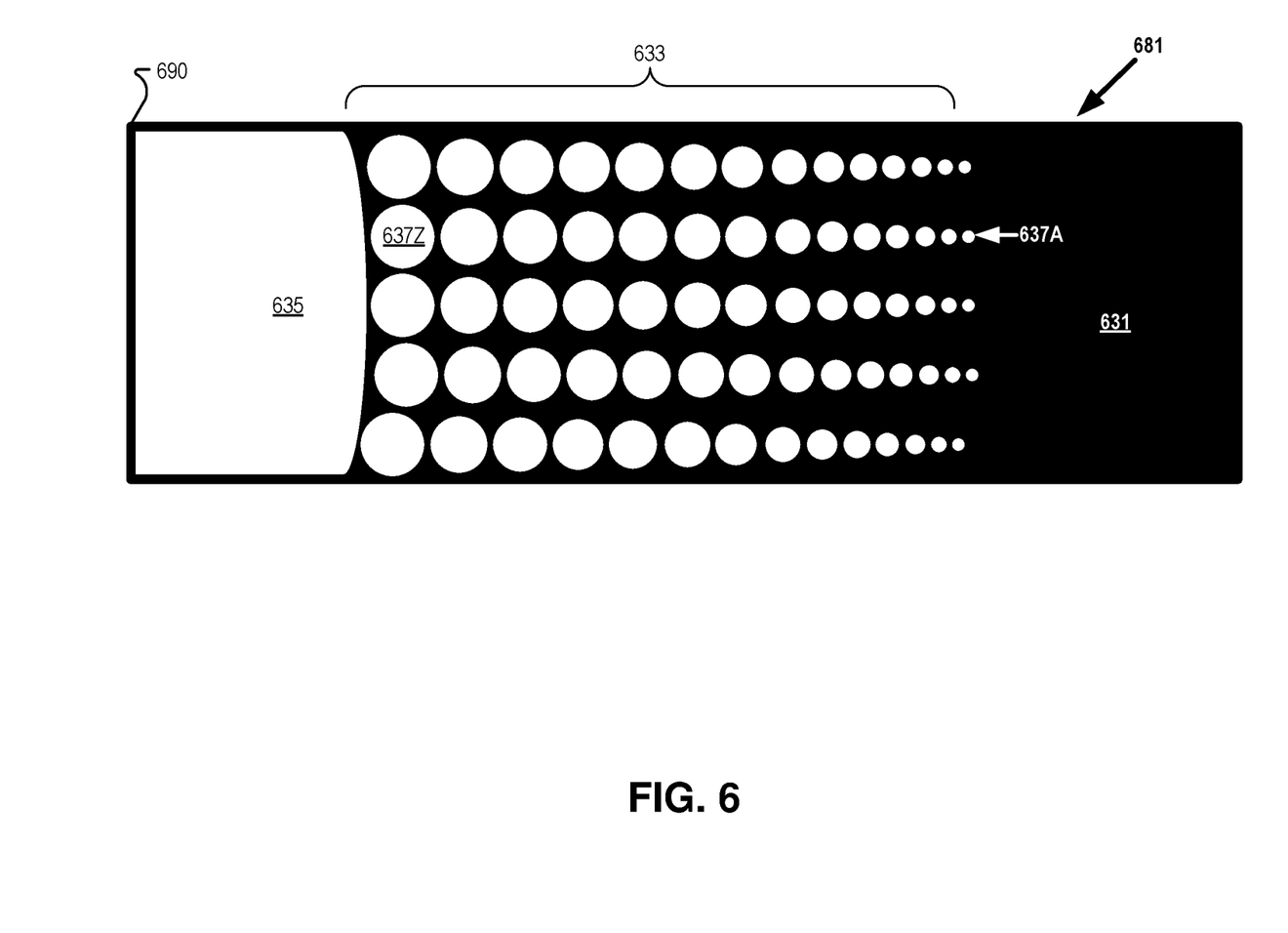
FIG. 6 illustrates another zoomed in example view of a region in FIG. 4, in accordance with an embodiment of the disclosure.

FIG. 6 illustrates a zoomed in example view 690 of region 490, in accordance with an embodiment of the disclosure. Example illumination gradient region 633 illustrates a plurality of dot features 637 arranged in a gradient so that there is a progressively decreasing radius of the dots 637 as a distance from an edge of the display decreases. For example, dot 637A (closest to region 631) has a radius that is less than the radius of example dot 637Z (closes to region 630). This allows for progressively less illumination of a display pixel array as a position in the illumination gradient region gets closer to a non-viewing region 631 of the illumination profile.

The dot features 637 arranged in a gradient may be implemented as voids in a reflective layer of a lightguide (e.g. lightguide 725). The white voids (shaped as dots) allow illumination light confined to the lightguide to escape to illuminate a display pixel array while the rest of the reflective layer (illustrated as black fill) of the reflective layer reflects the illumination light back into the lightguide. In this example, element 681 of FIG. 6 may represent a portion of the reflective layer. While circular dots are illustrated as the shape of an example light extraction feature in FIG. 6, it is understood that other shapes may be used in light extraction features to provide an illumination gradient.

FIG. 7 illustrates a side view of an example illumination gradient backlight having a backlight emitter 720 and a lightguide 725 that generates an illumination gradient 433 along a viewing boundary of a display pixel array, in accordance with an embodiment of the disclosure. FIG. 7 illustrates an edge-lit configuration where one or more backlight emitters 720 emit illumination light into lightguide 725. Backlight emitter(s) 720 may include a string of white LEDs (emitting white visible light) or red/green/blue LEDs being spaced with a sufficient mixing distance to allow the red, green, and blue light to mix into white light for illuminating a display pixel array.

In the illustrated embodiment, lightguide 725 is a wedge-shaped lightguide. Lightguide 725 may be formed of a refractive material such as polymethyl methacrylate (PMMA). In other embodiments, lightguide 725 may not be wedge-shaped and may be a flat type lightguide that does not have an angled bottomside to the lightguide. Instead, a flat type lightguide may have a bottomside that is on a substantially parallel plane as the extraction side of the lightguide. The flat type lightguide may also include an extraction layer similar to extraction layer 780, in FIG. 7. Lightguide 725 may include a reflective layer 741 and an extraction layer 780. In some embodiments, reflective layer 741 is coupled to an angled bottom side 727 of lightguide 725 to receive and direct illumination light emitted by backlight emitter(s) 720 out an extraction side 729 of the lightguide 725 to illuminate a display pixel array (not illustrated). The extraction side 729 is opposite the angled bottomside 727 in the illustrated embodiment.

Lightguide 725 may rely on reflective surfaces such as reflective layer 741 to confine the illumination light to the lightguide 725 prior to exiting the extraction side 729 as illumination light 721 for illuminating a display pixel array. Reflective layer 741 may include a mirrored surface or a white reflective surface that reflects over 95% of incident visible light. Lightguide 725 may also rely on total internal reflection (TIR) to confine the illumination light to lightguide 725 prior to exiting the extraction side 729 as illumination light 721 for illuminating a display pixel array. A combination of TIR and reflective layers on the edges of lightguide 725 may also be used.

As illustrated, the edge-lit configuration of FIG. 7 generates the illumination profile 430 of FIG. 4 that includes illumination gradient region 433 disposed between illumination regions 431 and 435. In embodiments where light extraction features are voids in a reflective layer, the reflective layer may be included in extraction layer 780 on the extraction side 729 of lightguide 725. In some embodiments, the extraction features are formed in a refractive material of the lightguide 725. For example, concave or convex dome structures may be formed in the extraction side 729 of lightguide 725 to assist illumination light propagating in lightguide 725 to overcome the critical angle to escape lightguide 725 as illumination light 721. The concave or convex dome structures may have similar radii and may be arranged similarly to the dot features 537/637 of FIGS. 5 and 6, respectively.

Figure 8:
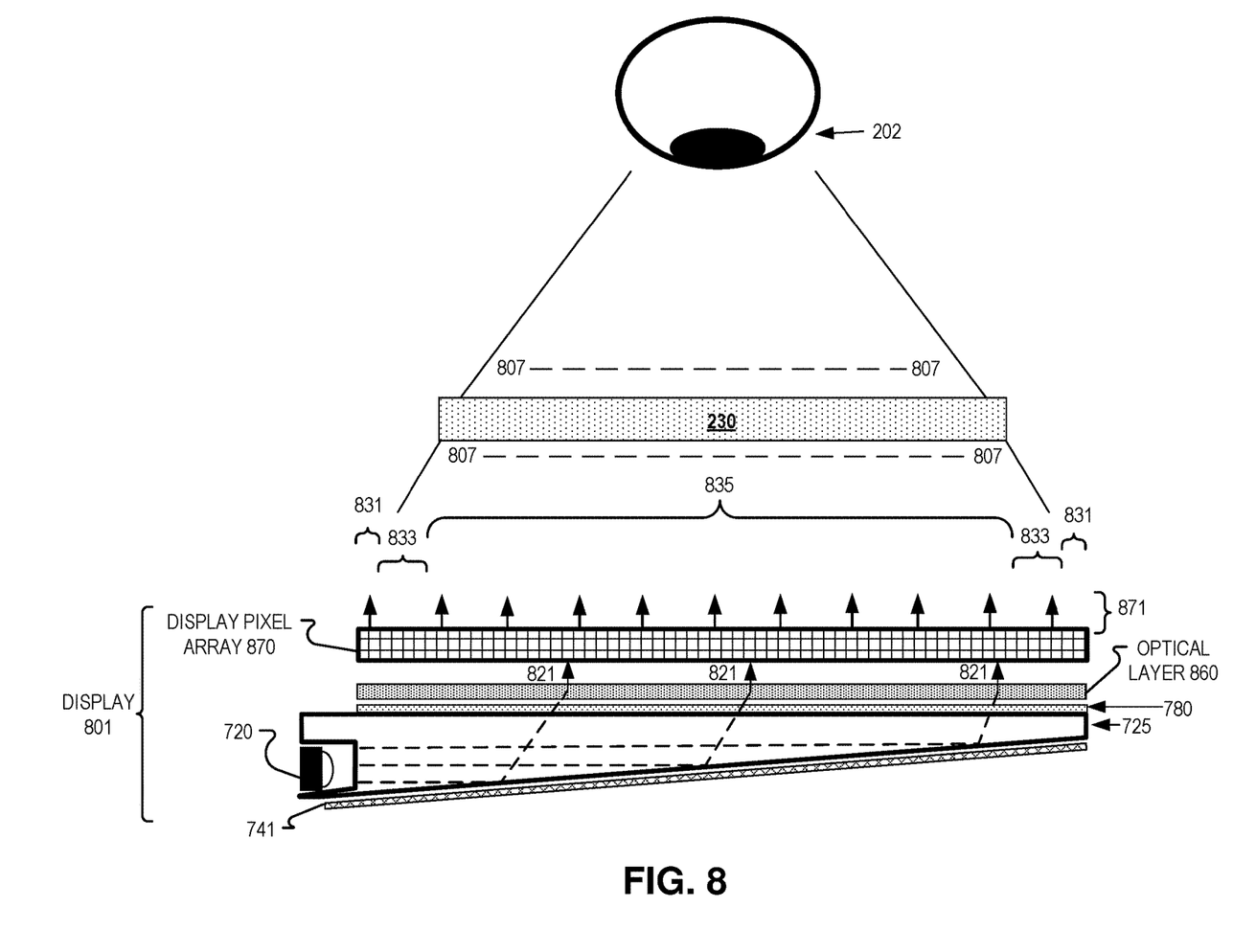
FIG. 8 illustrates a display that includes the structure of FIG. 7, an optical layer, and a display pixel array, in accordance with an embodiment of the disclosure.

FIG. 8 illustrates a display 801 that includes the structure of FIG. 7, an optical layer 860, and a display pixel array 870, in accordance with an embodiment of the disclosure. In FIG. 8, an optical layer 860 is disposed between lightguide 725 and display pixel array 870. Optical layer 860 may include various diffusers to evenly scatter illumination light 821 for illuminating display pixel array 870. Optical layer 860 may also include polarizers to polarize illumination light 821 to have a proper polarization orientation for display pixel array 870. Display pixel array 870 may be an LCD.

Optical assembly 230 focuses display light 871 to focus images included in display light 871 for the eye(s) 202 of a user of an HMD. Lens assembly 230 provides a FOV 807 to the eye 202 of a user of the HMD. The images included in display light 871 include an illumination gradient 833 along a FOV boundary of the lens assembly 230 with respect to display pixel array 870. Illumination region 831 may be fully dark since lightguide 725 does not illuminate the non-viewing region of display pixel array and illumination region 835 may be fully illuminated since lightguide 725 fully illuminates the viewing portion of display pixel array 870. Illumination gradient 833 may correspond to illumination gradient region 433 and illumination regions 831 and 835 may correspond to regions 431 and 435, respectively.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD) comprising:
a lens assembly for focusing display light to an eye of a user of the HMD; and
a display for providing display light, wherein the display includes:
a display pixel array;
a backlight emitter to provide illumination light; and
a lightguide to receive the illumination light from the backlight emitter and distribute the illumination light to illuminate the display pixel array, wherein the lightguide is configured to illuminate a field of view (FOV) boundary of the lens assembly with respect to the display pixel array with an illumination gradient.

2. The HMD of claim 1, wherein the lightguide includes a gradient of light extraction features that provides the illumination gradient along the FOV boundary of the lens assembly with respect to the display pixel array, and wherein the light extraction features output a smaller value of the illumination light as a distance from a particular light extraction feature gets closer to an edge of the display pixel array.

3. The HMD of claim 2, wherein the light extraction features include dot features, wherein a radius of the dot features decreases as the distance from a particular dot feature gets closer to the edge of the display pixel array.

4. The HMD of claim 2, wherein a density of the light extraction features decreases as the distance from the edge of the display pixel array decreases.

5. The HMD of claim 2, wherein the lightguide includes an extraction layer that confines the illumination light within the lightguide by reflecting the illumination light, and wherein the light extraction features are voids in a reflective layer of the extraction layer.

6. The HMD of claim 2, wherein the lightguide is formed of a refractive material and confines the illumination light to the lightguide based at least in part on total internal reflectance (TIR), and wherein the light extraction features are formed in the refractive material along an extraction side of the lightguide.

7. The HMD of claim 1, wherein the lightguide is also configured to suppress the distribution of the illumination light outside a FOV of the lens assembly and facilitate the distribution of the illumination light inside the FOV of the lens assembly.

8. The HMD of claim 1, wherein the FOV boundary of the lens assembly with respect to the display pixel array is elliptical in shape.

9. The HMD of claim 1, wherein the display pixel array includes liquid crystal display pixels.

10. The HMD of claim 1, wherein the lightguide is a wedge-shaped lightguide and the display is an edge-lit display.

11. The HMD of claim 1, wherein the backlight emitter includes at least one light emitting diode (LED).

12. The HMD of claim 1, wherein the display further includes a diffusing layer disposed between the lightguide and the display pixel array.

13. A display comprising:
a display pixel array;
a backlight emitter to provide illumination light; and
a lightguide to receive the illumination light from the backlight emitter and distribute the illumination light to illuminate the display pixel array, wherein the lightguide is configured to illuminate an elliptical viewing portion of the display pixel array with the illumination light, suppress illumination of a non-viewing portion of the display pixel array, and illuminate a viewing boundary of the display pixel array with an illumination gradient that fades from fully illuminated along the elliptical viewing portion to unilluminated along the non-viewing portion.

14. The display of claim 13, wherein the viewing boundary is shaped as an ellipse disposed between the elliptical viewing portion and the non-viewing portion of the display pixel array.

15. The display of claim 13, wherein the lightguide includes a gradient of light extraction features that provides the illumination gradient along the viewing boundary of the display pixel array, and wherein the light extraction features output a smaller value of the illumination light as a distance from a particular light extraction feature gets closer to an edge of the display pixel array.

16. The display of claim 15, wherein the light extraction features include dot features, wherein a radius of the dot features decreases as the distance from a particular dot feature gets closer to the edge of the display pixel array.

17. The display of claim 15, wherein a density of the light extraction features decreases as the distance from the edge of the display pixel array decreases.

18. The display of claim 15, wherein the lightguide includes an extraction layer that confines the illumination light within the lightguide by reflecting the illumination light, and wherein the light extraction features are voids in a reflective layer of the extraction layer.

19. The display of claim 15, wherein the lightguide is formed of a refractive material and confines the illumination light to the lightguide based at least in part on total internal reflectance (TIR), and wherein the light extraction features are formed in the refractive material along an extraction side of the lightguide.

20. The display of claim 13, wherein the non-viewing portion of the display pixel array extends from edges of the display pixel array to the viewing boundary.

* * * * *